May 27, 1941.  F. H. REHSE  2,243,488
ELECTRIC WELDING APPARATUS
Filed Nov. 30, 1938  10 Sheets-Sheet 4
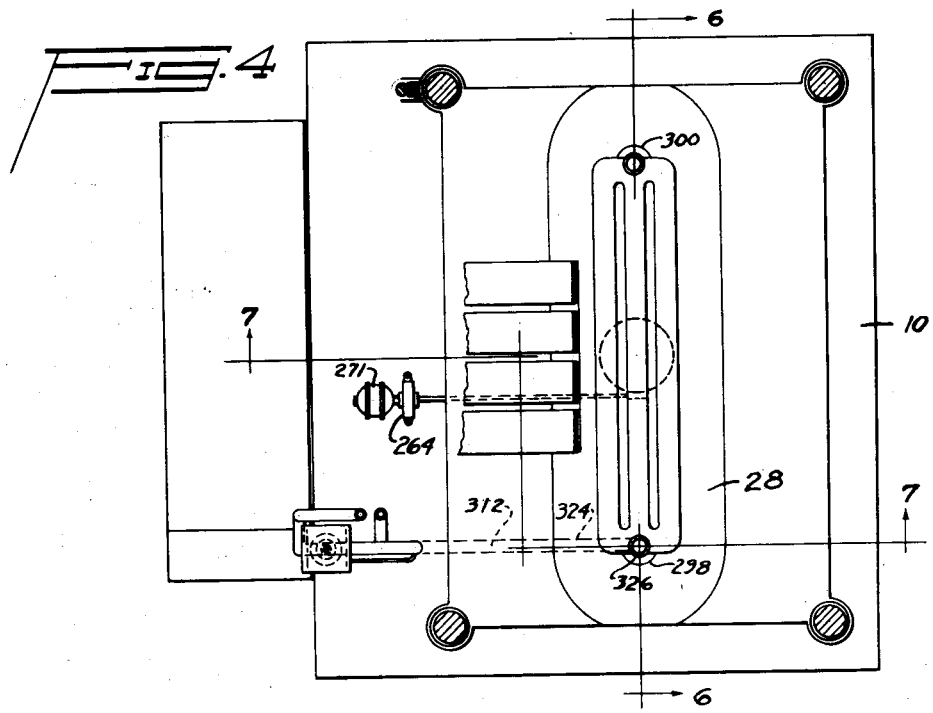
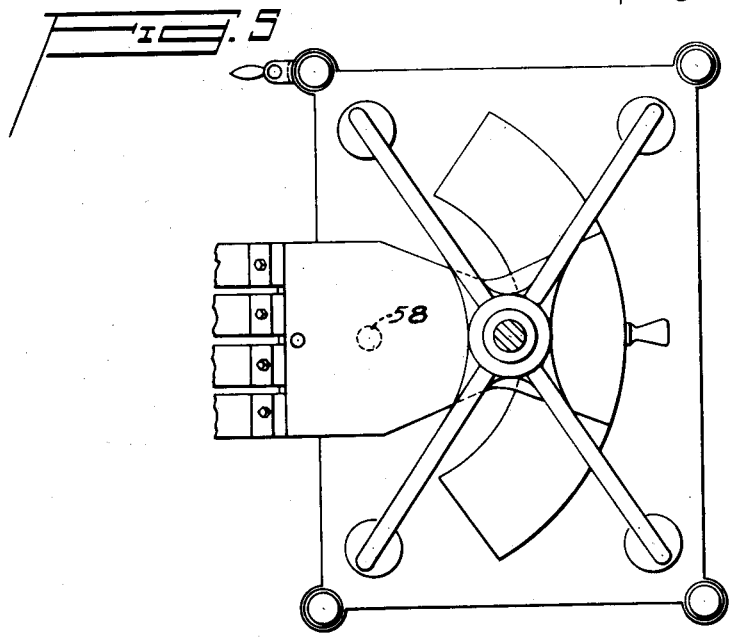
INVENTOR
Frank H. Rehse

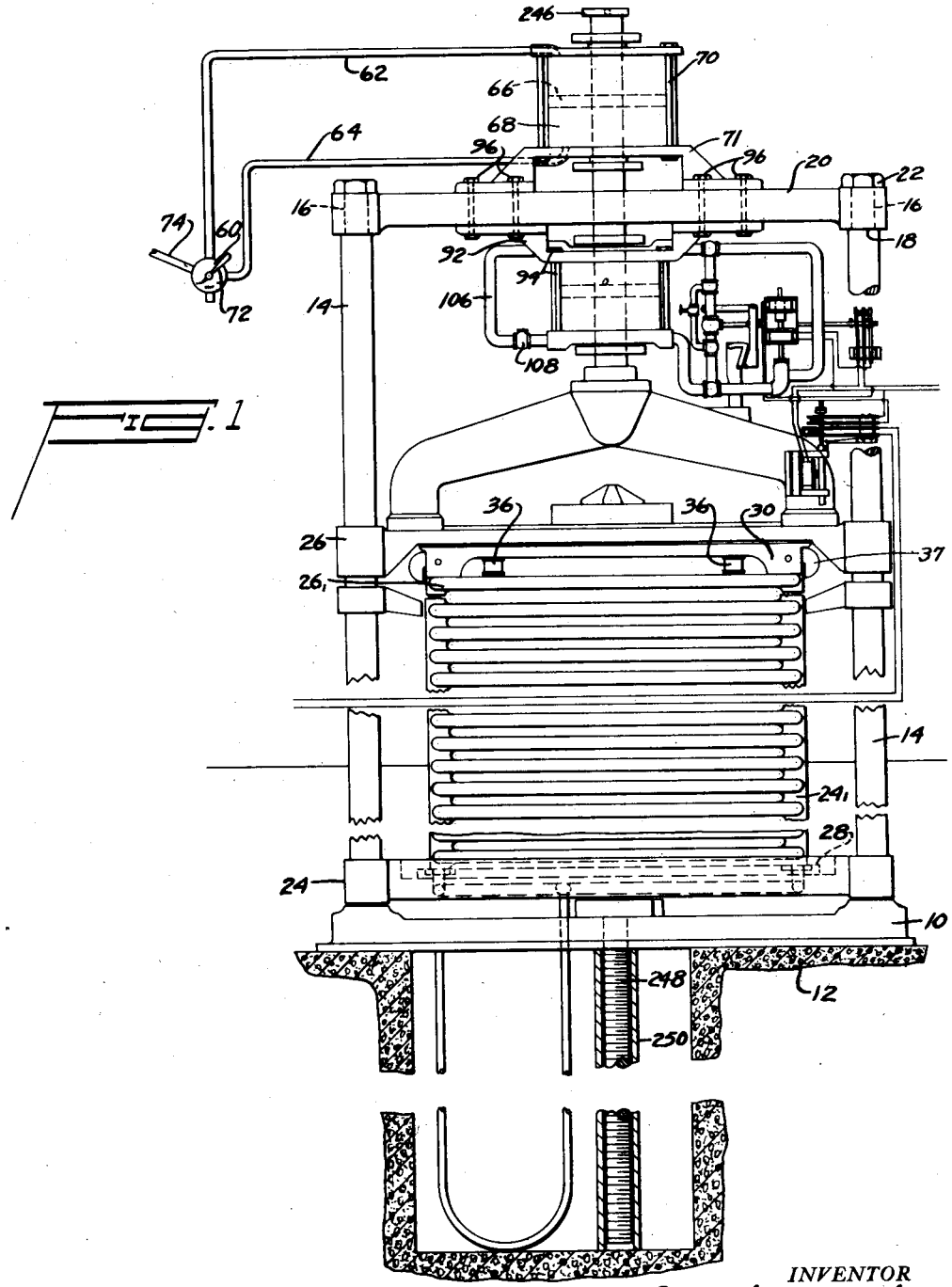

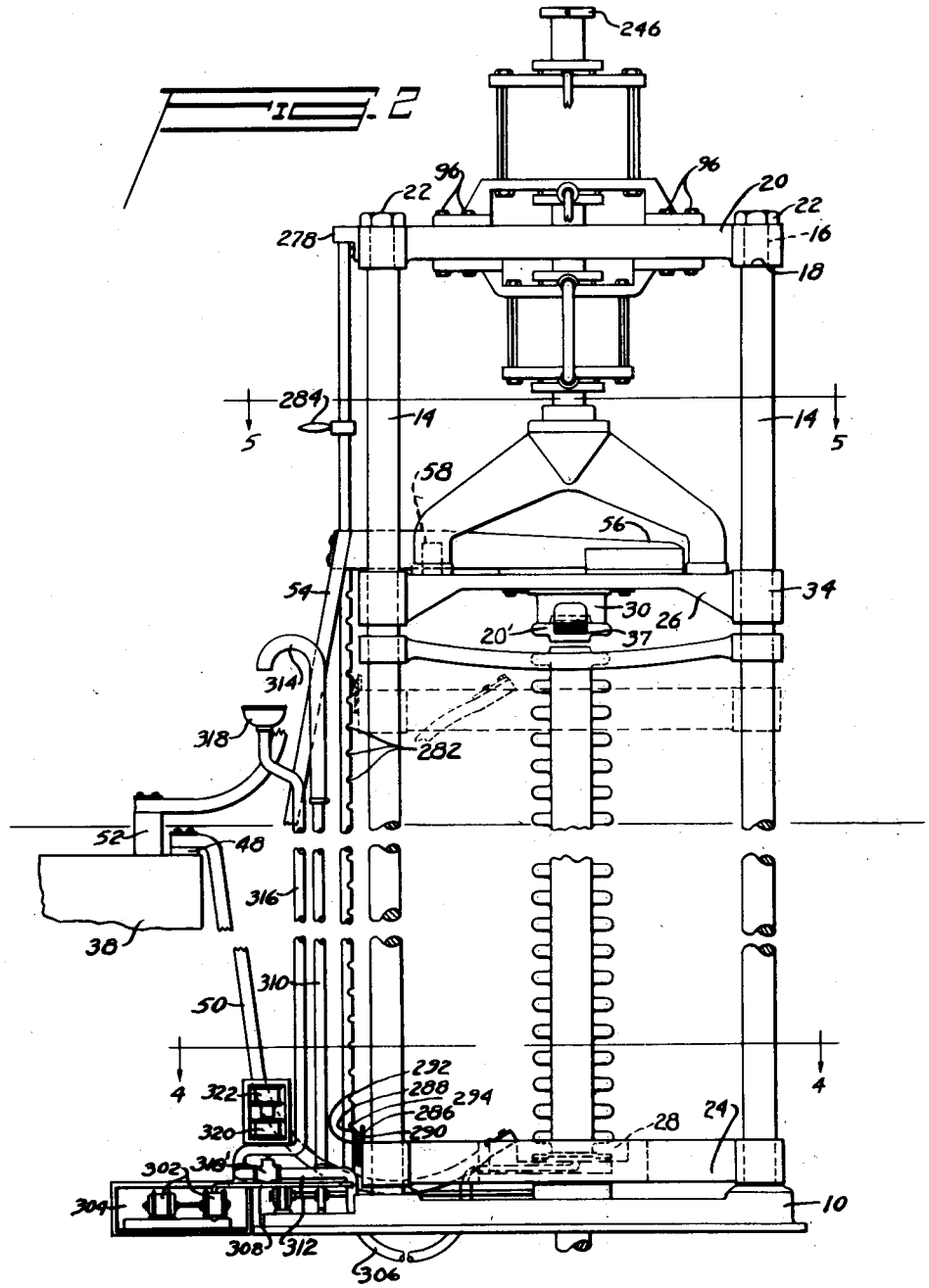

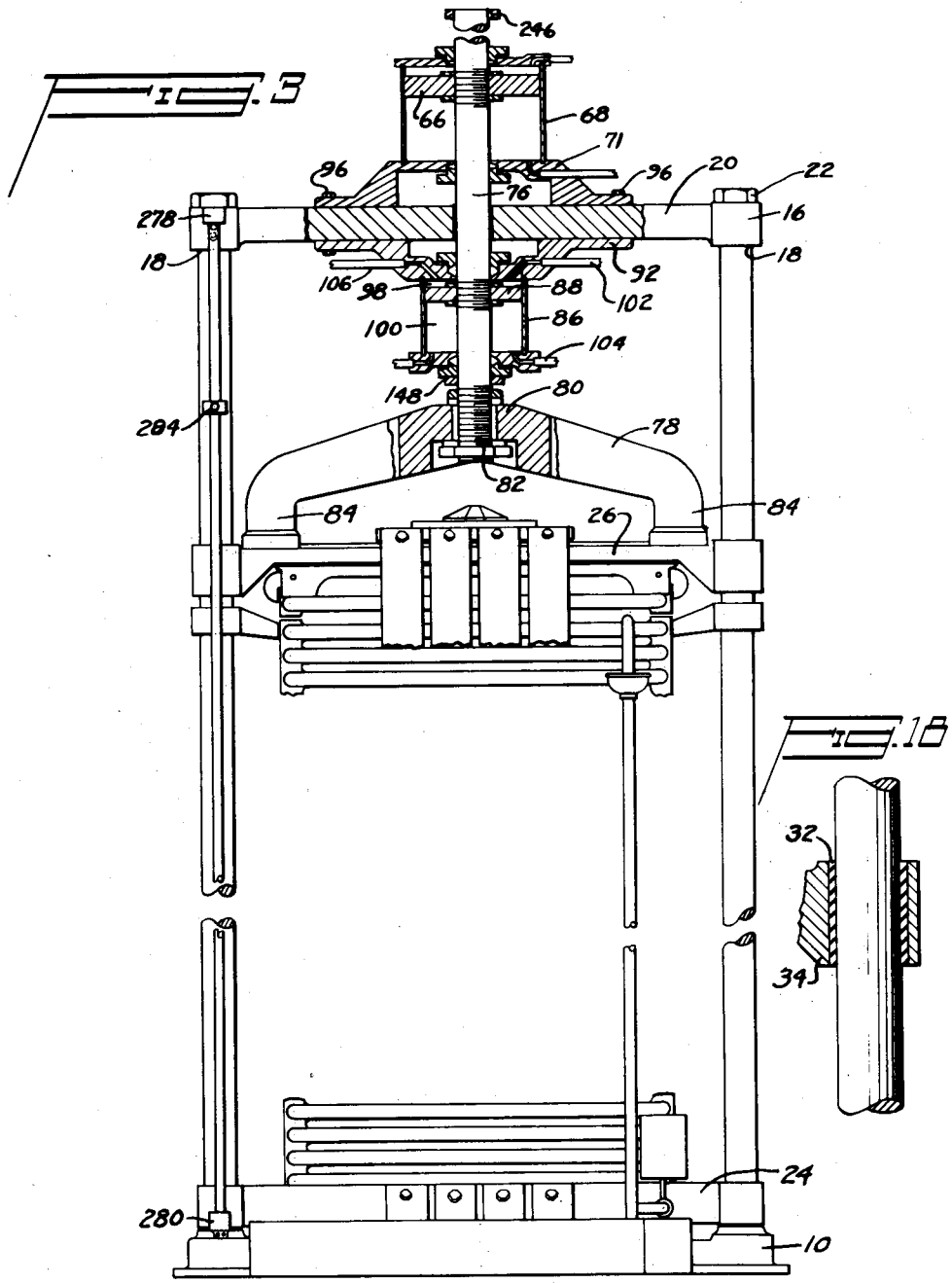

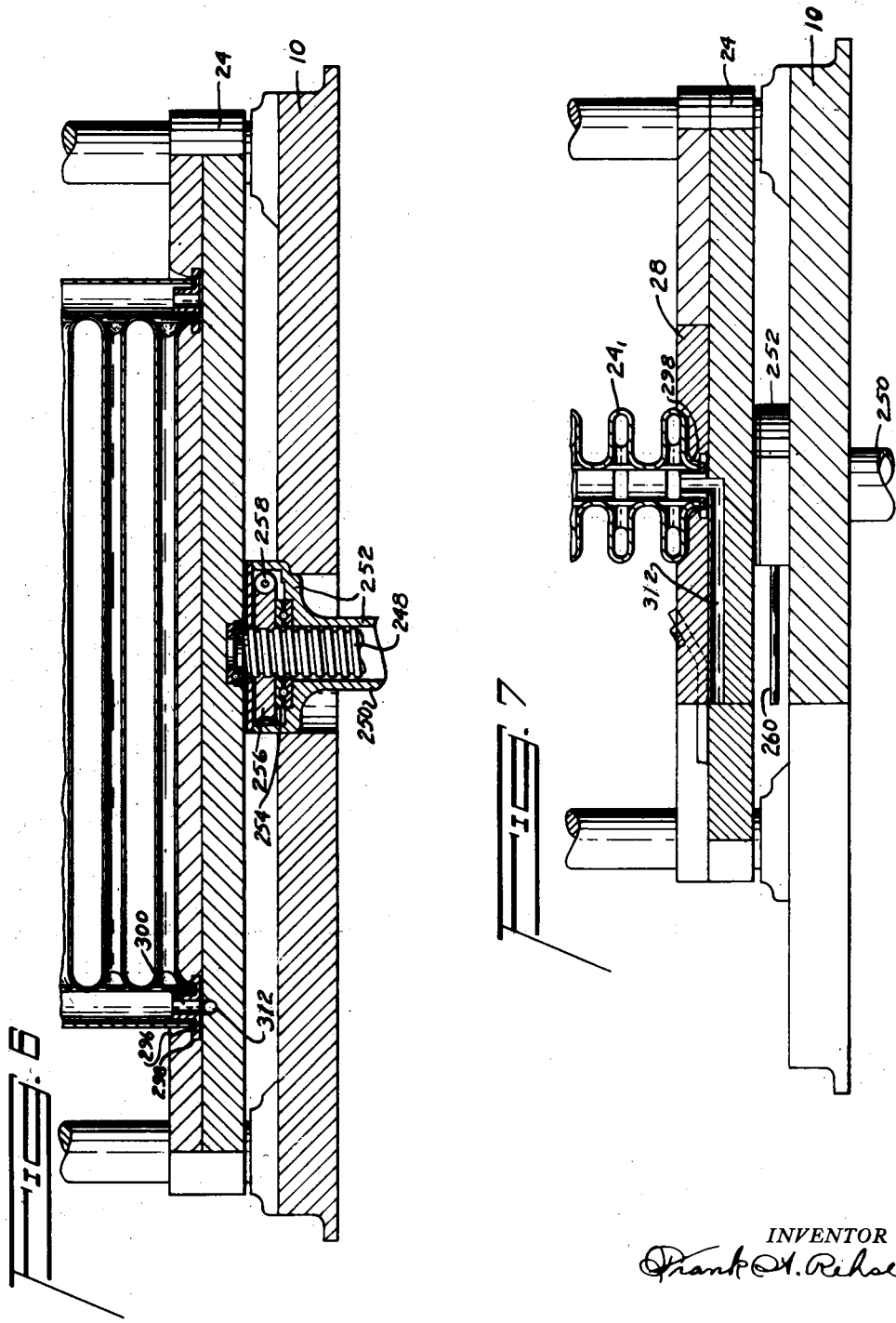

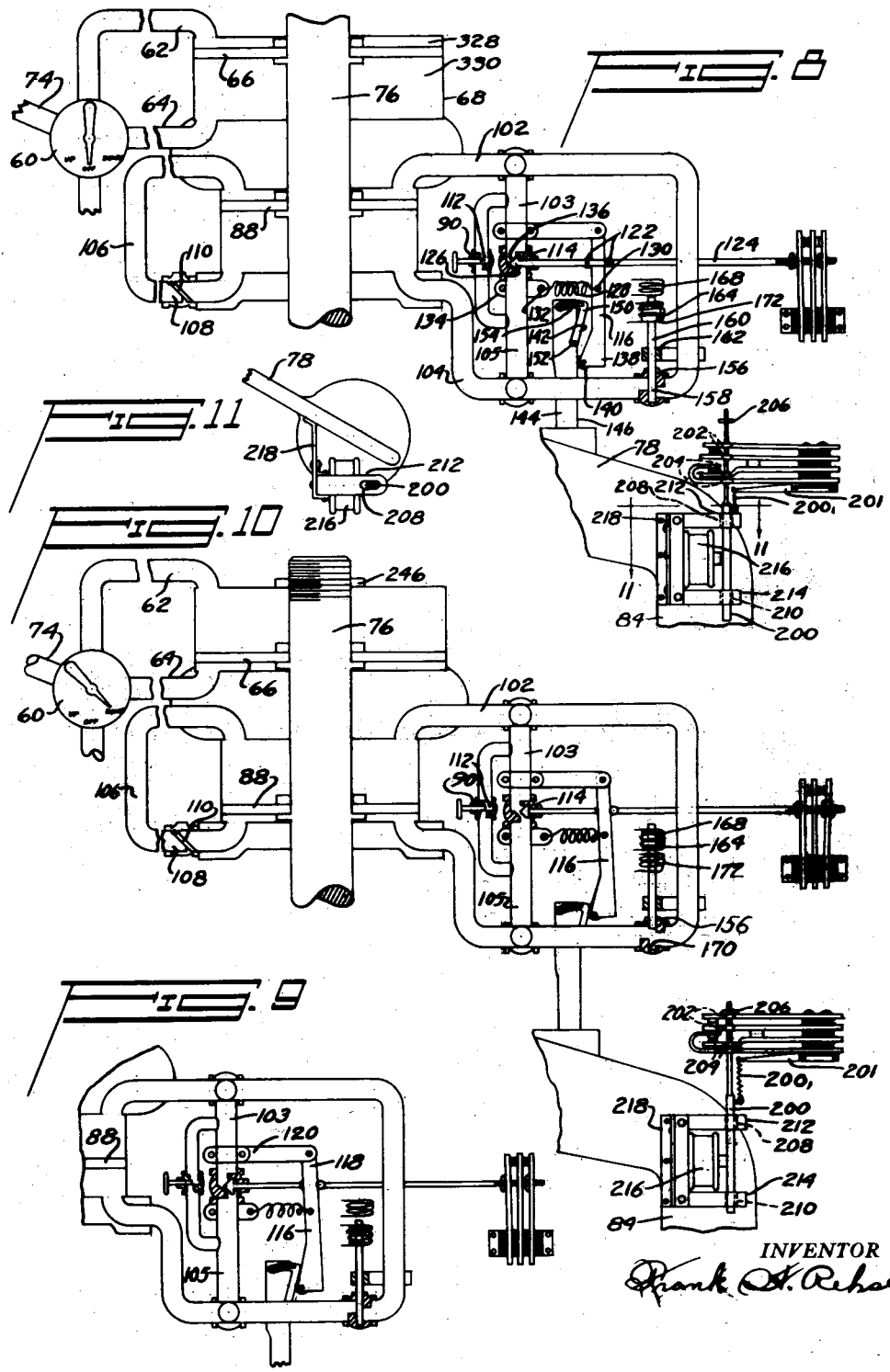

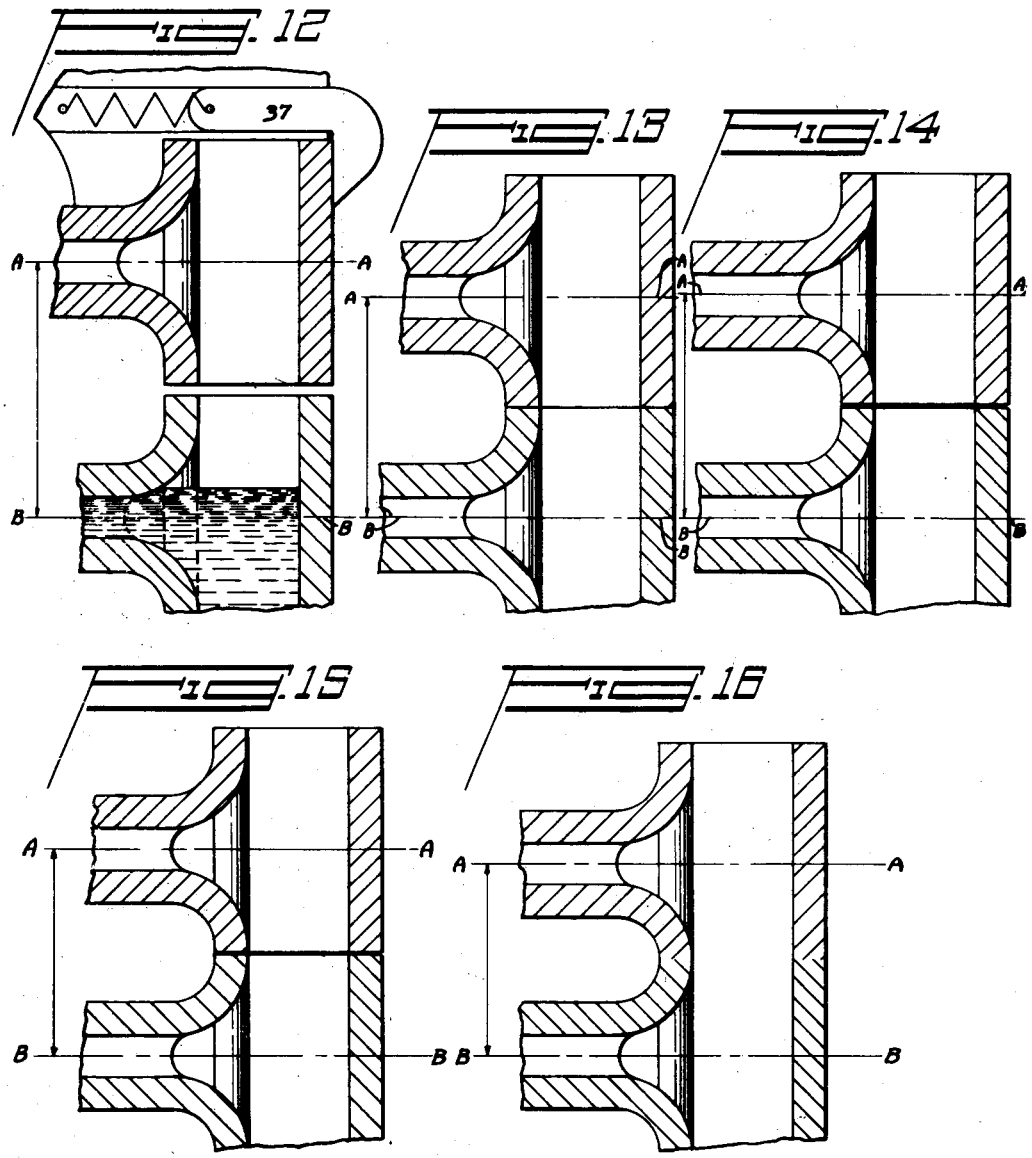

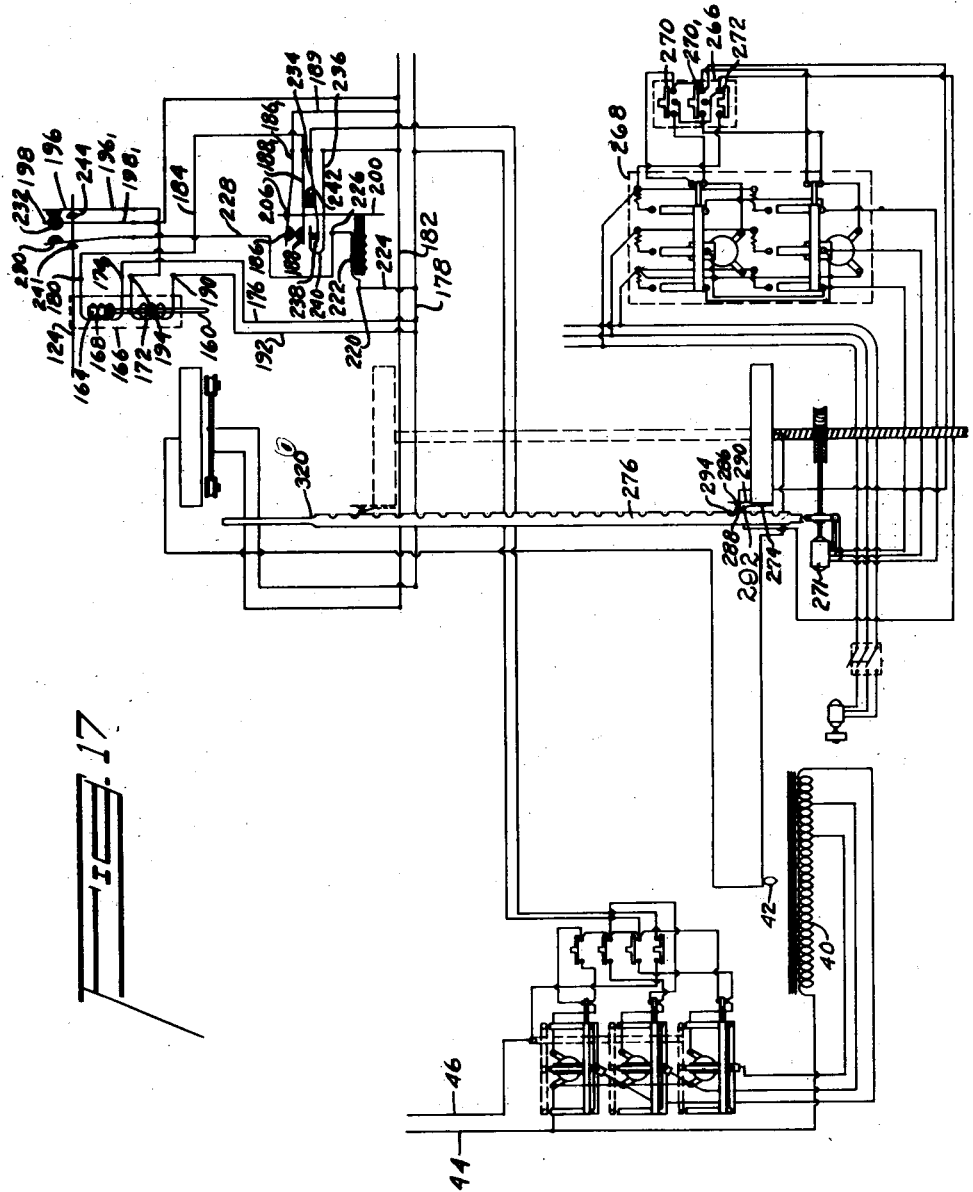

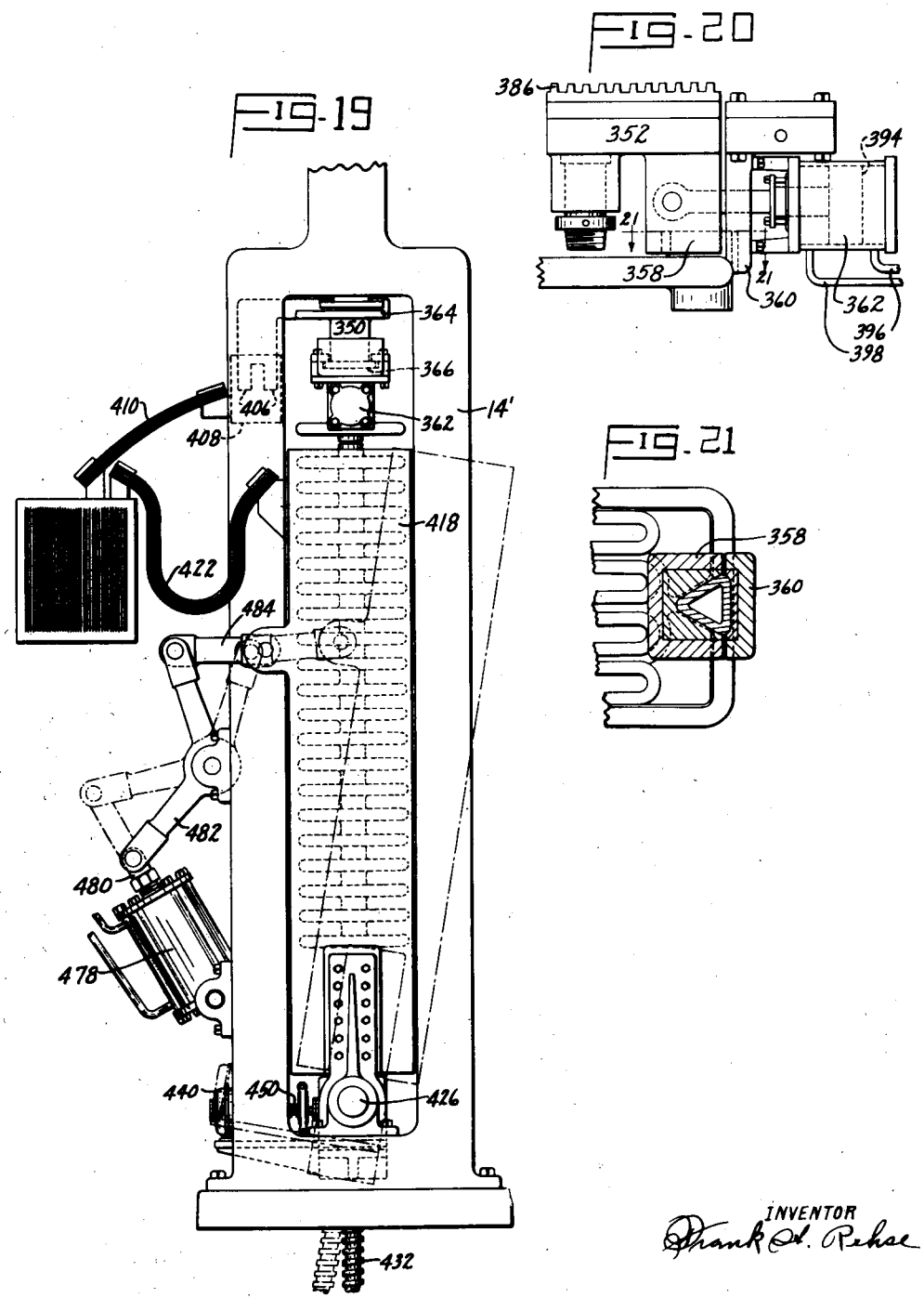

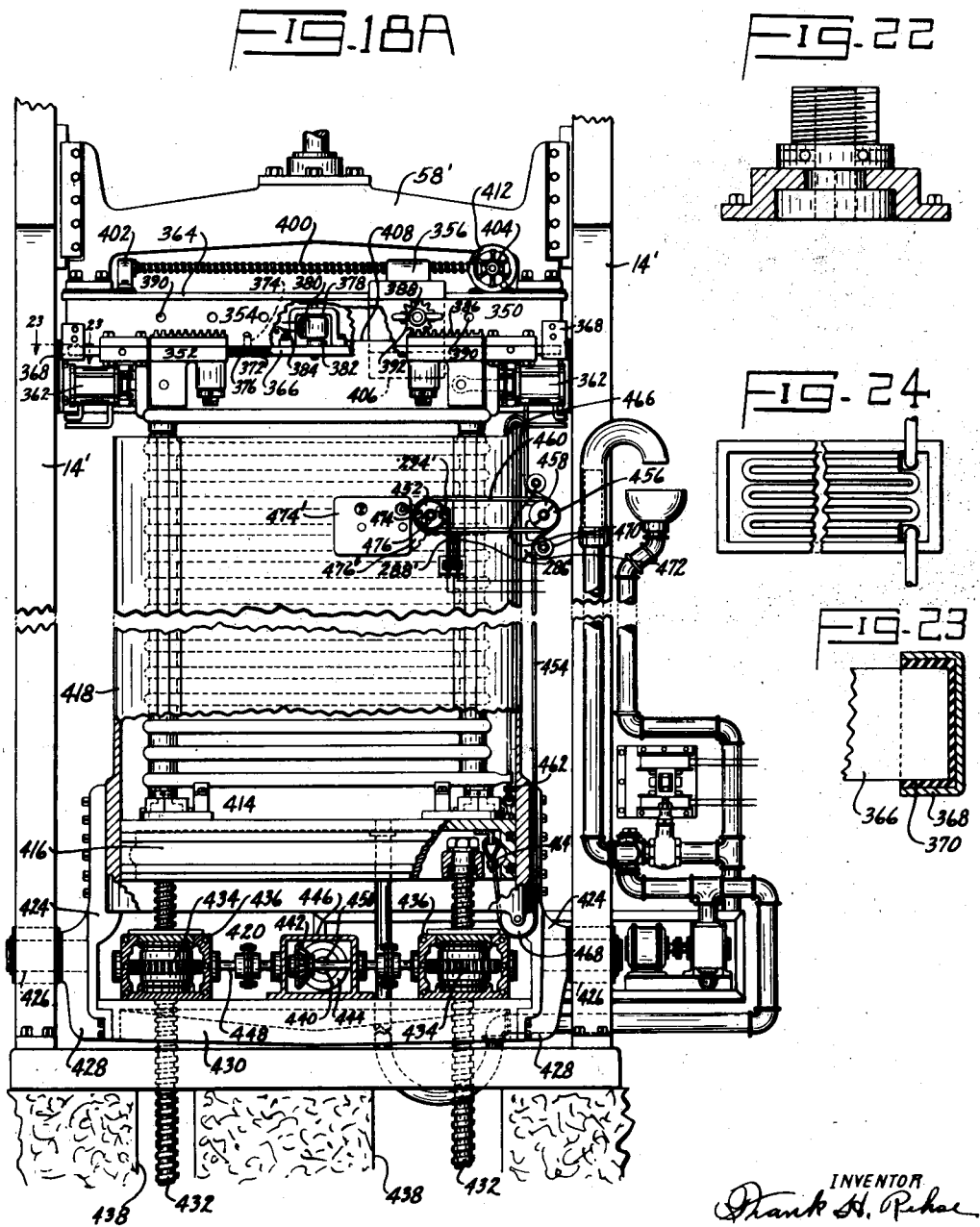

Patented May 27, 1941

2,243,488

UNITED STATES PATENT OFFICE 2,243,488

ELECTRIC WELDING APPARATUS

Frank H. Rehse, Dayton, Ohio, assignor of one-fifth to Max Isaacson, Dayton, Ohio Application November 30, 1938, Serial No. 243,239

42 Claims. (Cl. 219—4)

This invention relates to a novel method of electric heat-treating and welding of metals and a novel apparatus adaptable for use in connection therewith and is a continuation in part of my copending application Serial No. 3,655 filed January 26, 1935. More in particular the novel process relates to the electric heat-treatment and welding of metals, such as, cast iron, wrought iron, cast steel or the like, whereas the novel apparatus relates to that class of electric welding in which separate pieces of work are moved relatively toward each other and are simultaneously heated by the passage of an electric current to a temperature that will effect "flashing off" of the adjacent edges of the work and thereafter effecting the weld; the novel apparatus being capable of use with various metals and is particularly adapted for use in connection with the welding of hollow metal articles, such as, cast iron radiators and the like.

The original Thomson process of electric butt welding was practiced by bringing two pieces of metal articles to be welded in contact with each other; passing a heavy current thru them; maintaining contact between the articles to be welded throughout the welding operation; forcing the articles together when a welding temperature is reached and at the same time cutting off the current.

An improvement of the Thomson process of electric butt-welding that is being generally practiced is called flash welding. In accordance with this flash welding process the articles to be welded are brought together with a very light pressure thereby effecting a greater concentration and more even distribution of heat at the joint to be welded and consequently a reducing in the power required to produce the weld. As soon as the articles are brought together a small arc or "flash" is formed which commences to burn away the points or particles of metal through which the circuit is completed. This flashing is continued until the abutting ends are arcing all the way around the circumference. At this point a sudden application of more pressure stops the flashing and the joint then quickly attains the running or welding heat. The ends of the tube are now shoved together to produce the weld and the current turned off.

Although the flash welding process, as heretofore employed was found satisfactory in butt welding articles made of steel, in which cases the final pressure is in the nature of a forging operation, its employment in connection with the butt-welding of articles made of cast iron (which, of course, cannot be forged), such as, radiators, pipes and the like, has not been successful in practice. This was due primarily to the fact that the operator followed the same process in welding cast iron as he did in welding steel with the result that in making the weld the final pressure which was applied was such as to produce a crushed condition.

While the invention disclosed herein is capable of application generally to the electrical resistance welding of various kinds of materials, and it is the intention to cover all such applications broadly, the process and apparatus herein disclosed is adapted particularly to the welding of articles made of metallic materials which, because of their inherent physical characteristics, require precise control of the pressure and temperature to be applied thereto during the forming of the weld.

In carrying out the improved process an improved electrical apparatus is employed which permits the bringing together and the passing of welding current through the pieces of work to be welded by means of electrodes of good heat conducting materials which are adapted to be relatively arranged as to equalize the areas in cross-section and, therefore, the resistance of the two pieces of work at their junction or junctions, to prevent the pre-heating of one side ahead of the other. This feature is particularly useful where the improved process is used in connection with the butt welding of cast iron radiator sections where two separate welds are simultaneously produced as will be hereinafter described more in detail. The current is first regulated to adapt it to the work to be done, after which the pieces of work are brought together, the pressure applied being very light and as uneven projections come into contact across from opposite edges they are burned or "flashed" off until continuous contact is made over the entire area of the abutting edges at which time a slight increased pressure is applied bringing the contacting edges together with a minimum of pressure required for closing the secondary circuit. This will permit the full current flow through the portions of the work between the electrodes for pre-heating the same the length of time of pre-heating depending upon the current, voltage, the size of work and the approximately predetermined heat desired which can be judged from the color or glow of the work by an experienced operator or determined by suitable indicating apparatus.

At this point the predetermined temperature is slightly below the welding or re-casting heat and the two pieces of work are then caused to separate for a relatively short distance sufficient to draw an arc. The pieces of work are then again moved relatively toward each other at a controlled speed to maintain a relatively short and dense arc and for a predetermined distance sufficient to obtain, during the period of travel, the recasting temperature or molten state at their junction. At the instant the recasting temperature is reached which will correspond to the time when the work has moved the predetermined distance the welding current is interrupted and simultaneously the speed of movement of the work is abruptly increased for a relatively short predetermined distance of travel so that the final pressure with which the two pieces of work are brought together is substantially that which will produce a proper grain growth of the united molten metal at their junction.

By this novel process of electrically heat treating the adjacent edges of two cast iron pieces of work to the molten state and flowing the molten edges together, by rapidly moving the two pieces together with a minimum of pressure there will be effected a union in which the grain growth is equal if not better than the grain growth of those portions of the work located other than at the union.

In the accompanying drawings and in the following description is disclosed a novel apparatus for carrying out this process but it is not desired to be limited to the same as it is illustrative only, the apparatus being capable of other uses and the process being capable of being carried out by other apparatus suitable for different purposes.

Referring to the drawings:

Fig. 1 is a front elevational view of a dual-welding machine embodying the invention, the machine being adapted for welding together radiator sections to form a radiator column.

Fig. 2 is a side elevational view of the machine shown in Fig. 1, looking from left to right.

Fig. 3 is a rear elevational view of Fig. 2, certain parts being shown in section and the radiator column and the bus bars electrically connecting one terminal of the secondary to the work, being broken away.

Fig. 4 is a horizontal sectional view taken on the line 4—4 of Fig. 2 showing the source of supply of the liquid electrode, the relative arrangement of the radiator column platen and lower support, together with the actuating means for the support.

Fig. 5 is a horizontal sectional view taken on the line 5—5 of Fig. 2 showing the adjustable electrode center finder.

Fig. 6 is a longitudinal sectional view taken on the line 6—6 of Fig. 4.

Fig. 7 is a transverse sectional view taken on the line 7—7 of Fig. 4.

Fig. 8 is a diagrammatic fractional view with parts in section showing the pressure control means for the upper support in its initial operating position.

Fig. 9 is a diagrammatic fractional detail view with parts in section showing the relation of parts of the pressure control means for the upper support when in an intermediate operating position.

Fig. 10 is a view similar to Fig. 8 showing the respective positions of the components of the pressure control means for the upper support when in the final operating position.

Fig. 11 is a fractional detail view.

Figs. 12 to 16 are sectional views showing the radiator hub portions of adjacent superposed radiator sections as they appear for each operation successively in the cycle of operations performed by the welding machine.

Fig. 17 is an electrical diagram showing the electrical circuits employed in the welding machine, and Fig. 18 is a sectional detail view.

Fig. 18A is a front elevational view of a further embodiment of my invention with parts broken away and in section.

Fig. 19 is a side elevational view looking from left to right in Fig. 18A.

Fig. 20 is an enlarged detail view.

Fig. 21 is a sectional view taken on the line 21—21 of Fig. 20.

Fig. 22 is an enlarged detail sectional view of a coupling conduit for fixedly connecting the end section of the radiator stack to the lower supporting electrode and for establishing communication between the interior of the section and the current conducting liquid container.

Fig. 23 is an enlarged detail view taken on the line 23—23 of Fig. 18A, and

Fig. 24 is a top plan view of the current conducting liquid tank showing a cooling coil.

As illustrated the machine is designed to produce a novel type radiator construction in which opposing hubs of adjacent radiator sections are respectively joined together simultaneously by electrically re-casting their opposing abutting edges, or connecting hubs.

This machine comprises the usual transformer with a primary circuit to carry an alternating current of any desired voltage, that may be established by a series of switches to make available any voltage range desired, and a secondary circuit for carrying a current of low potential but of relatively large volume. This secondary circuit includes upper and lower work conforming electrodes which when moved together to bring the work in contact, close the circuit. Both electrodes are made of a material of high electrical conductivity, the upper electrode being an externally conforming platen that is preferably made of copper and is provided with an adjustable electric center finder, whereas the lower electrode is in the nature of a liquid, preferably mercury, that is caused by a regulated supply means, to fill one hollow radiator section after another as they are united and moved downwardly together from their respective elevated positions. Thus a current path of relatively low resistance is obtained direct to the radiator nipples that are being united, which if otherwise, that is, if a liquid contacting medium were not employed the column of jointed radiator sections as they are increased in number, would, by reason of their light metal lines and low cross sectional area increase resistance and also because their irregular contour would make it practically inefficient to obtain the desired recasting heat and furthermore it would be practically impossible to obtain a uniform distribution of current flow throughout the cross sectional area of the nipples. The machine is provided with suitable means for holding the separate radiator sections in intimate contact with their respective electrical contactors and for controlling and limiting the extent of their relative movement in the making of the union so as to obtain uniform lengths of nipple connections thruout the radiator column. For this purpose, power driven means are provided for raising the lower radiator section supporting means to a predetermined elevated position for joining the first two sections of the radiator column and also for lowering the same to predetermined successive positions so that the upper radiator section after being united with the lower radiator section will be moved to the predetermined position of and then constitute the lower radiator section. The raising and lowering operations are manually started and automatically stopped.

There is also provided reversible power driven devices for actuating the upper electrode together with its complementary upper radiator section at an adjustably controlled speed in one direction for "flashing off" and for a limited length of movement so that the upper radiator section at a predetermined point in its travel, is brought into contact with the lower radiator section and for actuating the upper electrode and its complimentary radiator section in the opposite direction at a relatively faster speed to quickly separate these sections and draw an arc that preferably is made extremely short and dense.

This machine is provided with control means such as adjustable liquid metering devices for governing the rate of downward movement of the upper electrode and its complementary radiator section to automatically maintain the established arc length substantially constant during the relative travel of the work and until the fluid state is reached.

This downward movement will be required to be at an increasing rate to maintain the constant arc because simultaneous with the movement of one piece of work relative to the other the temperature of the oppositely disposed edge portions will be progressively increasing and consequently the rate of "flashing off" will correspondingly increase.

The machine is provided with electrical switching means for interrupting the welding current when the fluid state of the metal along the opposing edge or surface portions of the work is obtained and with means for effecting a limited relative surging movement of the two radiator sections to flow the molten edge portions together into a casting.

Referring to the drawings and in particular to Figs. 1, 2 and 3, the dual-welding machine, as illustrated consists of a longitudinally extending rectangular bed frame 10 suitably supported at the side thereof on a concrete base or floor 12 (see Fig. 1).

Extending upwardly from the four corners of the bed frame are four uprights 14 that are respectively formed with reduced threaded extensions 16 to provide shoulders 18 upon which a top frame 20 is supported and clamped by means of nuts 22.

A lower movable support 24, carrying a lower radiator section or column 24' and an upper movable support 26, carrying an upper radiator section 26', are slidably mounted upon the uprights 14 each of said supports being provided with work conforming platens 28 and 30 respectively. The upper support 26 is insulated from the uprights by suitable electrical insulating material in the form of bushings 32 that are seated within the bosses 34.

The upper support is provided with work holding means and it consists of the work conforming platen 30 and a pair of electro-magnets 36 that hold the upper radiator section against the platen.

Different sizes of platens (upper and lower) will be used for different sizes of radiators and accordingly the platens are detachably connected to their respective supports by bolts. The upper platen is provided at its ends with slidable end contact members 37 to engage the ends of the radiator section. These members are yieldingly expansible so that radiator sections that may vary slightly in longitudinal dimension may be inserted therebetween.

A transformer 38 is illustrated for supplying the welding current. This transformer comprises a primary winding 40 and a secondary winding 42. The primary winding consists of a number of turns that are adapted to be connected to the power current leads 44, 46 thru any well known three stage mechanical interlock to obtain or make available selected voltages according to the current desired. The secondary winding consists of one turn, one end 48 of which is connected to the lower platen thru a flexible buss bar 50 of sufficient length to accommodate the maximum upward movement of the lower platen, whereas the other end 52 is connected to the upper electrode thru a flexible buss bar 54 and a movable, current conducting, contacting arm 56 which is manually operated to control the distribution of welding current in a manner and for the purpose hereinafter described. The flexible buss bar 54 is made of sufficient length to accommodate the maximum extent of vertical movement of the upper support as well as the maximum extent of lateral movement of the contact arm. The secondary circuit is completed when the respective radiator sections are brought together by moving the upper and lower platens toward and in contact with each other.

The electrically conducting finder or current distributing contacting arm 56 is carried by and pivotally attached to the upper support at 58 in such a manner as to be capable of movement laterally along an arc of a relatively large circle. This is accomplished by placing the pivot 58 along the central transverse portion of the support and to the rear thereof. By making the contacting area of the contacting arm large it will be seen that small movements to one side or the other from its normally disposed central position will effect an appreciable change in the respective resistances of the opposite ends of the platens and the work between them.

The upper support 26 is actuated toward and away from the lower support 24 by means of pressure fluid such as compressed air that is transmitted thru a manually controlled three way valve 60 (see Figs. 8, 10), and fluid conductors 62, 64 leading to opposite sides of a piston 66 operating in a fluid pressure cylinder 68 that is mounted upon and attached by means of rods and nuts 70 to a supporting bracket 71 that is fixed to the top frame 20. This valve is provided with a lever 72 for rotating the valve to either side of its neutral position to establish communication between the supply line 74 and either of the connecting pipes 62, 64 to thereby respectively lower or raise the support 26 at will. This valve is positioned at a point near the machine where it is convenient for the operator to take hold of the lever. The piston 66 is connected to the support 26 thru a piston rod 76 and a four legged spider 78 that has its apex 80 connected to one end 82 of the rod and its four legs 84 connected to the support 26.

The stroke of the piston is divided into a plurality of distinct movements the velocities of which are regulated to obtain the desired relative rates of movement of the radiator sections as well as the desired pressure between them for the different successive operations of "flashing off," for preheating, of "preheating" and of "flashing off" for the removal of excess metal while progressively increasing the density of the arc and the temperature of the metal edges to a molten state and flowing together the molten edges of the two sections to make the weld or cast joint.

In order, therefore, to accurately adjust and regulate the velocity for a given distance of travel of the support 26 during the "flashing off" operation there is provided a suitable liquid metering apparatus between the movable support 26 and the top frame 20. As illustrated this apparatus consists of a cylinder 86, a piston 88 and an adjustable metering valve 90. The cylinder 86 is attached to a supporting bracket 92 by means of rods and nuts 94, the supporting brackets 71, 92 being fixedly connected to opposite sides of the top frame 20 by means of bolts and nuts 96. The cylinder 86 is disposed below and in tandem relation with the cylinder 68 so that the connecting rod 76 will operate both pistons 66 and 88 as the work support is moved in either direction. Communication between the metering valve 90 and the chambers 98, 100 on opposite sides of the piston respectively, is established by means of conduits 102, 104 that are respectively connected at the top and bottom of the cylinder 86. One way communication between the chambers 98, 100 is also established by means of a conduit 106 and a flapper valve 108 arranged to move in one direction. The cylinder 86 as well as the pipe connections are filled with liquid so that a downward movement of the piston will cause the flap 110 to close and the liquid on the bottom side of the piston will be forced thru the orifice 112 in the valve 90 and conducted to the opposite side of the piston. Assuming a given pressure, that is applied to the piston for moving the same, to be constant, the velocity of the piston will then depend upon the size of this orifice. It will therefore be obvious that by adjusting the size of this orifice thru the metering valve the desired velocity for obtaining the desired length and density of arc during the "flashing off" operation for preheating can be established. The distance of travel of the piston 66 during this "flashing off" operation is ordinarily determined by experiment by limiting the upward movement of the piston and by observing the extent of its downward movement in a manner hereinafter described.

In order to accurately adjust and regulate the rate of relative movement of the radiator sections toward each other, the extent of this movement and the duration of the application of the welding current for the heating operation, to eliminate the personal judgment of the operator and to effect a series of homogeneous welded or cast joints of uniform length by successive automatic operations of the machine, a further adjustable metering device is provided and is automatically controlled for regulating the movement of the piston 66 and for automatically interrupting the primary circuit the instant the proper fluid state of the abutting edges of the radiator hubs is reached.

As illustrated in Figs. 9 and 10, a variable metering valve 114 is disposed between and connected to the conduits 102, 104 by means of pipe connections 103, 105, the valve 114 being arranged in parallel with the valve 90.

This valve 114 is normally closed during the portion of the piston stroke corresponding to the "flashing off" period for preheating, see Fig. 8, and is progressively increasingly opened during the second "flashing off" period during which the arc is re-established at the rate of movement governed by the valve 90. For this purpose a lever 116 is pivotally supported at one end 118 to a bracket 120 that is fixed to the pipe connection 103. This lever is disposed between rollers 122 formed on a rod 124 that constitutes an extension of the needle valve 126. The needle valve is actuated into open and closed positions thru the sliding engagement between the lever and rollers as the lever is moved about its pivot.

A helical tension spring 128 is attached at one end 130 to the lever at a point below its engagement with the rollers and at its other end 132 to the conduit 105 thru a bracket 134 for urging the needle valve against the valve seat 136. The lower end 138 of the lever 116 is provided with a roller 140 that is adapted to engage a cam 142 carried by a vertically disposed rod 144. This rod 144 is fixedly attached to the spider 78.

The roller 140 is arranged to be slightly spaced from the neutral face 146 so that the metering valve 114 will be maintained closed thruout the first "flashing off" period for preheating and that portion of the second "flashing off" period during which the arc is re-established. However, if desired, the valve 90 may be dispensed with and in that case the metering valve 126 will be kept open the desired amount by suitably arranging the roller 140 and needle valve 126 with regard to their respective engaging surfaces. Furthermore, if it is desired to move the piston 66 during the "flashing off" operations at a faster rate than that which would take place when the open area of either of these orifices is constant the neutral face 146 can be changed to a slightly upwardly inclined surface.

When the neutral face 146 has advanced by reason of the downward movement of the support 26 so that the roller 140 is about to ride on the cam face 142 the "flashing off" operation for preheating will have been completed as well as the preheating and the arc for the second "flashing off" operation will have been re-established. The radiator hub edges will have advanced from a position as indicated in Fig. 12 to a position as indicated in Fig. 13, for preheating, separated and again advanced to a position shown in Fig. 14 where the arc is re-established shortly thereafter, which corresponds approximately to the position of hub edges in Fig. 13 the acceleration of their relative movements commences. By determining through experiment the limit of the upward movement of the piston 66 which can be set by an adjusting nut 148 threaded to the rod 76, the roller 140 will assume approximately the same position for successive operations at the termination of the "flashing off" piston stroke.

The inclination of the cam face 142 can be regulated by providing an inverted L shaped member 150 that is disposed within a recess formed at the upper end of rod 144. This member is pivoted at its lower end 152 to the rod adjacent the neutral face 146 and is adjustably connected to the cam rod at its other end 154 by means of an arcuate slot formed in the lever and a pin passing thru the slot and threaded to the rod 144. The degree of this inclination or cam face contour is ordinarily determined by experiment and it will be such as is required to advance the support and its work at the desired increasing speed or speeds depending upon the character of work. Automatic means is provided to obtain an interruption of the current at the instant the piston 66 has moved a predetermined distance which should correspond to the time when the slightly separated edges of the radiator sections have reached a desired molten state, as shown in Fig. 15, and to still further accelerate the piston movement for a limited extent of movement as shown in Fig. 16. The acceleration of the final movement of the piston is controlled by a relief valve 156 that is connected between conduits 102, 104, this valve being arranged in parallel circuit with the valves 90, 114.

The flow of liquid thru the relief valve 156 is controlled by a sliding valve 158 having a long stem 160 vertically movable in a guide 162 that is secured to the pipe connection 102. This stem has attached thereto a core 164 movable in a solenoid 166. This solenoid is provided with an upper and a lower winding so that when the upper winding 168 is energized, the core 164 and valve 158 will be lifted thus permitting the liquid, by reason of the relatively large size opening 170 of the valve, to surge from one side of the piston 88 to the other; and when the lower winding 172 is energized, the core 164 will be moved to its lower position, thus bringing the valve 158 into closed position and shutting the flow thru this channel. Referring to Fig. 17 it will be seen that one terminal 174 of the upper winding is connected by a lead 176 to the current supply line 178 the other terminal 180 is connected to the power return line 182 thru a lead 184 and a pair of contacts 186, 188 carried by contact arms 186' and 188' and thru a further lead line 189. The lower winding 172 has one of its terminals 190 connected to the supply line by a lead 192 and its other terminal 194 connected to the return line thru a pair of contacts 196 and 198 carried by contact arms 196' and 198'.

The opening of the relief valve 156 is effected by means of a floating control device that is disposed between the movable support 26 and the machine frame. This control device consists of a bar or armature 200 that is yieldingly suspended by means of a spring 200' one end of which is connected to the bar and the other end to a supporting bracket 201 which in turn is attached to the upright 14. The upper end of the bar extends thru insulated openings formed in the contact carrying arms 186' and 188' where it is provided with an adjusting nut 206 that is adapted to engage when in the desired position, the contact arm 186' for connecting contact 186 with contact 188. The other end of the bar is preferably made of soft iron and is normally movable freely in openings 208 and 210 formed in a pair of spaced guides 212 and 214 and disposed adjacent an electro-magnet 216. This electro-magnet is attached to one leg of the spider 84 by means of a bracket 218. One terminal 220 of the electro-magnetic winding 222 is connected to the power line 178 thru a lead line 224 and its other terminal 226 is connected to the return line by a lead line 228 and a pair of contacts 230 and 232. The bar is rectangular in cross section at its lower end portion and the openings in which this bar is disposed have a complementary shape but are of slightly greater dimension than the bar in the direction toward the electro-magnet 222, so that the bar will not be restrained against movement toward and in contact therewith.

To interrupt the welding current at substantially the same time as the opening of the relief valve 156 the extension rod of the floating bar 200 is arranged to pass thru openings formed in contact arms 234 and 236 which carry contacts 238 and 240. The contact arm 234 is attached for movement with the contact arm 188' thru an insulating block 242. Thus it will be seen that contacts 238, 240 will be separated immediately after contacts 186, 188 have been brought together by an adjusting nut 241 on the extension rod 124, upon continued downward movement of the support and floating bar 200 that carries the adjusting nut 206.

To insure that the lower coil which normally maintains the relief valve 156 closed, is deenergized prior to the time when the upper coil is about to be energized for opening of said valve the extension rod 124 of the valve 114 is provided with an adjusting nut 244 that is disposed between contact arms 196', 198' and is adjustably positioned on the rod to disconnect the contacts 196, 198 in advance of the connecting of the contacts 230 and 232.

It will thus be seen that as the upper radiator section is moved downwardly toward the lower radiator section from the position where the roller commences to ride on the cam face 142 the area of the valve opening 136 will be gradually increased thereby offering a progressively decreasing resistance to the movement of the working piston 66 with a consequent increase in the rate of movement of the radiator section 26'. It will, of course, be apparent that the acceleration of the work may be varied to suit the particular needs by adjusting the adjustable cam 150. The most efficient speed will, of course, depend in accordance with my improved process upon the length of time required to obtain the desired fluid state of the adjacent edges for a given "flashing off" or relative movement of the work. At some predetermined point in the travel of the roller along the cam face and in advance of the time when the contacts 230 and 232 are caused to engage, the contacts 196 and 198 will be disconnected and the coil 172 will be de-energized so that the relief valve will not be restrained against movement to its open position when the coil 168 is energized.

Obviously, if the given distance for "flashing off" is relatively small and it requires a relatively long time to obtain the desired fluid condition of the metal along the edges to be joined together, then the rate of acceleration will be slow, whereas, if the given distance for "flashing off" is relatively long and it requires but a relatively short time to obtain the desired fluid condition, then the rate of acceleration will be relatively faster, but whether the predetermined distance is relatively small or large which can be established by the adjusting nuts 241 and 206 the rate of acceleration of the work will be adjusted to a rate dependent upon the distance factor as well as the existent or "preheating" temperature factor immediately prior to this relative movement. Adjusting means is provided for limiting the downward surging movement of the support after the welding current is interrupted to an extent sufficient to close the arc gap and to effect a flowing together of the fluid edges of the radiator nipples so as to produce a cast joint. For this purpose the piston rod at its upper end extends thru the cylinder end plate and is threaded to receive an adjusting nut 246. Leakage at the points where the piston rod passes thru the end plates of the cylinders is prevented by the well known means such as gland nuts.

Referring to Figs. 6 and 7 it will be seen that the lower support 24 which carries the lower platen 28 has suspended downward therefrom and rigidly attached thereto a vertically adjustable threaded spindle or shaft 248 that extends within and is enclosed by a tubular vertical upright 250. This upright is attached to a gear housing 252, which in turn is attached to the bed plate 10.

Rotatably supported upon roller bearings 254 within the gear housing is an internally and externally threaded gear 256, the internal threads being adapted to engage the threads of the spindle and to raise and lower the same. The gear 256 is rotated by a worm gear 258 fixed on a transversely extending shaft 260. This shaft 260 is connected to a motor 271 through a magnetic brake 264 (see Fig. 4), the motor being fixedly supported on the bed plate 10.

As the motor and brake are well known in the art no description thereof will be given. Suffice it so say that the circuit operating the motor and brake includes a push button switch 266 (see Fig. 17) and a well known three pole magnetic reversing switch 268 adapted to be operated by said push button for breaking the circuit or for reversing the polarity thereof to change the direction of rotation of the motor and thereby either raise or lower the support. Connected in series with the "stop" switch 272 is an auxiliary switch 274 that is automatically controlled by a cam rod 276. This cam rod is rotatably supported in and insulated from a pair of guides 280, 278 (see Fig. 3), that are fixed to the base plate 10 and top plate 20, respectively. This rod is provided with a series of uniformly spaced notches 282 which determine the intermediate positions as well as the uppermost and lowermost positions to which the lower support and its corresponding radiator section or sections is or are movable.

A handle 284 is provided intermediate the ends of the cam rod and above the notches in a position convenient for the operator to rotate the cam rod into different positions for making and breaking contacts 286, 288. These contacts are carried by contact arms 290 and 292 respectively, which in turn are attached to and movable with the support 24. When the rider 294 forming a part of contact arm 292 is opposite any one of the notches, separation of the contacts is automatically accomplished to break the circuit and automatically apply the brake 264 and lock the support 24 against vertical movement. By rotating the cam rod to a position where the notches are no longer opposite to the rider 294, the contacts 286, 288 are brought into engagement and the circuit closed. It will now be obvious that by closing either of the control circuits that include the "raise" or "lower" push buttons 270 and 270' respectively, the motor 271 will be actuated to raise or lower the support depending upon which of said buttons is selected and the movement of the support will continue until the contacts 286 and 288 are separated when the support has reached the uppermost or lowermost position of travel.

The lower platen is provided at each end with a conical bore 296 and a countersunk bore 298. Disposed between the lower platen 28 and the support 24 and seated within the countersunk bore is a flanged bushing 300. The radiator nipples are telescoped with the bushings 300 and are seated against the flanges thereof and in spaced relation with the conical bores 296 to provide wells for receiving a liquid current conducting medium, such as mercury.

A liquid current conducting medium preferably mercury is supplied to the interior of the column of the radiator sections by means of a motor driven pump 302, (see Fig. 2) that is connected at its inlet end to a source of supply in a tank 304 and at its outlet end to the flexible conduit 306 through a conduit 308 which has a relatively small capacity compared to the capacity of conduit 306.

The normal position of the mercury level within the radiator section is predetermined and automatically controlled by an adjustable overflow arrangement which consists of a stand pipe 310 that is in communication at its lower end with a by-pass pipe connection 312 and at its upper end with an adjustable goose-neck 314. This goose-neck is adjustably clasped in telescopic arrangement with the stand pipe 310 with its overflow end immediately above a receptacle 318 that is in communication with the tank 304 thru the return pipe 316. A valve 318' is arranged in the by-pass pipe connection 312 for establishing or shutting off communication between the return pipe 316 and the stand pipe 310. This valve is similar in construction to the valve 156 and is actuated into open and closed position by a solenoid that is similar in construction to the solenoid 166. The valve 318 is normally maintained in closed position by keeping the lower coil 320 energized, and the upper coil 322 de-energized. When, however, it is desired to open the valve, the lower coil 320 is de-energized and the upper coil 322 is energized in the well known manner by a two way switch (not shown) that is manually operated at will.

It will be obvious that since the pipe 306 and 312 have a much greater fluid carrying capacity than the pipe 308, the mercury contained within the radiator column and the return pipe 316 will be drained into the supply tank when the valve 318 is opened, even tho the pump 302 is continuously operating. Furthermore, the lower platen being disposed above the uppermost lever of the pipe 312 thru which mercury is returned to the supply tank when the valve 318 is open, there will be practically no loss of mercury when the radiator column is removed after its completion.

For carrying out the novel process above described the manner of operating the machine as illustrated in Figs. 1 to 17 is as follows:

The operating parts of the machine are brought into inoperative position with the lower support in its lowermost position, and the upper support in its uppermost position as shown in Fig. 2, the valves 114, 156 and 318 closed and the valve 90 open and the source of electric current disconnected from the electrodes 28, 30.

The cam operated switch is manually angularly rotated to bring the contacts 286, 288 together to close the circuit and supply current to the motor and at the same time de-energize the magnetic brake 264 so that the spindle 248 is moved vertically upward and with it the lower support 28 thru the driving connections between the motor and spindle until the contacts 286, 288 arrive at the circumferentially reduced portion 320' whence the cam rod is manually rotated to the position as shown in Fig. 2.

The radiator sections to be welded together are then disposed upon and held against their respective conforming platens or dies 28, 30 and the goose-neck 314 is adjusted so that the liquid current conducting medium which is supplied to the interior of the lower radiator section through conduit 306 and conduit 312 formed in the lower support will assume a level with the lower radiator sections as shown in Figs. 2 and 12.

Fluid pressure is then applied to the upper work chamber 328 of fluid pressure cylinder 68 (see Fig. 8) to operate the piston 66 and causes the upper support 26 and the corresponding radiator section to move downwardly towards the lower radiator section and at the same time an electric welding current of the desired characterics is applied to the welding edges through the medium of the transformer 38 and the electrodes 28, 30. The rate of travel of the support 26 is controlled by the piston 88 operating to displace the liquid from chamber 100 to chamber 98 (Fig. 3) by metering the liquid that is displaced thru the externally regulated orifice 112 in such a manner that for an approximately predetermined distance of travel of the center line A—A of the upper radiator section from its position in Fig. 12, to approximately the position in Fig. 13, the opposing edges will have been flashed off approximately an equal amount on opposite sides of their junction, a uniform arc will have been established for the full circumference of the edges and the opposing edges will have been brought together into contacting relation, thus completing the secondary circuit and allowing full current flow thru the radiator section to effect a rapid heating of the contiguous edge positions of the two sets of opposing nipples.

The fluid pressure is now relieved by operating valve 60 to the "off" position but the two radiator sections are held firmly together with a pressure substantially equal to the weight of the radiator section, its support and other parts movable therewith.

The edges are held together for a sufficient length of time to heat the metal at the edges to an approximately predetermined temperature. If the edges of opposing nipples on one side of the radiator sections appear to be heating at a faster rate than those on the other side of the radiator section the center finder arm 56 which is normally centrally positioned with respect to the lateral and longitudinal axes of the electrode 30 will be positioned closer to the nipple edges having the lesser heat to effect a greater current flow therethrough and thus compensate for such inequality existing in the cross sectional areas of the sets of nipples.

When the edges to be joined have been brought to the desired temperature the lever 72 is again operated to quickly separate the edges a relatively small distance sufficient to obtain a short close arc as shown in Fig. 14. This is accomplished by supplying fluid pressure to the work chamber 330 and by permitting a comparatively unrestricted flow of the metering liquid from the upper side of the piston 88 to the lower side thru the by-pass connection 106 and one way valve 108.

The lever 72 is now operated to again reverse the movement of the upper support 26 and the established arc is maintained by moving the upper radiator section towards the lower radiator section at a carefully controlled speed by means of the automatically controlled variable metering orifice 136 so that within approximately a predetermined distance of travel of the upper radiator from the position in Fig. 14 toward the lower radiator as indicated by the relative change in position of their respective center lines in Fig. 15, the metal at the edges will have been brought to a molten state, whence the hydraulic resistance against the downward movement of the upper radiator section is abruptly reduced thru the automatic opening of the relief valve 156 (see Fig. 10) and simultaneously therewith the welding current is shut off by the action of the floating armature 200 brought into play at the instant the upper radiator has moved the predetermined distance to close the energizing circuit 186 that includes contact 188 and energizing coil 168 and to open the main supply circuit by breaking contact between contacts 238, 240. The upper radiator section is thus permitted to move towards the lower radiator section with an abruptly increasing speed so as to flow the molten edges together but is limited in its travel by the adjusting nut 246 (Fig. 3) on the upwardly projecting end of the rod 76 contacting with the upper end plate of the fluid pressure cylinder so that the final pressure with which the molten edges are forced together is such that the natural grain growth of the metal at the joint is not affected.

The supporting magnets 36 are de-energized so that the jointed radiator sections are supported solely by the lower support 28, which is now moved to its next adjacent lower position by manually operating any suitable well known switch to de-energize the magnetic brake 264 and starting the reversible motor into operation so that it rotates in the direction that will lower the support 28 until the contact rider that follows the rod 276 is again seated in an immediately lower notch.

A further embodiment of my invention is shown by way of illustration, in Figs. 18A to 24, briefly described above.

Irregular hollow bodies as those of which the radiator sections are an illustration and particularly where as illustrated the fabrication of the radiator sections into a unitary stack or block is such that one of the bodies, during fabrication constitutes a greater part of the finished article, will have the objectional effect of producing a varying resistive path and current distribution by reason of the variation in length of the stack with each additional section when the work is permanently connected to a current source through a fixture and cable. Furthermore such bodies have the objectionable effect of producing an irregular current distribution by reason of the variation in cross-sectional area.

In order therefore to provide an adequate and continuing contact with such work piece and maintain a substantially constant resistance for the path over which the electric current travels from the source of current thru the work piece and to the point of contact the transformer secondary is provided with a hollow terminal to receive therein a current conducting liquid and the welded stacked sections after each welding operation in such manner as to maintain a substantially constant secondary welding circuit resistance.

This embodiment of my invention further contemplates the provision of a hollow terminal of the character above described that is pivoted and constitutes a support for the work support actuating means, whereby the finished article may be moved from the welding position to a position accessible for removal of the article from within the hollow terminal and to facilitate such removal from said support by said actuating means.

In this embodiment, the construction and arrangement of the devices for controlling the movement of the upper work-supporting electrode or terminal 350 is identical to that shown and described in connection with that of upper electrode 26 (Fig. 2) except that the clamping of the corresponding radiator section is accomplished by a pair of fluid pressure actuated clamping devices 352 at opposite ends of a hollow I-shaped current conducting span 354 and further instead of the pivoted current distributor 56 (Fig. 2) there is provided a slidable current distributing device 356. As already noted above, any parts of the machine of this embodiment that are electrically connected with the work pieces are insulated from the frame of the machine. The current conducting span is constructed from two sections, an upper inverted U-shaped member 364 preferably made of ferrous cast metal and a lower flat metal plate 366, preferably an aluminum alloy.

The upper section is fixedly connected at opposite ends to and insulated from the yoke 58'. The upper flat surface of the lower plate section is supported against the side wall flat edges of the upper section but is capable of relatively small lateral and longitudinal displacement relative to said upper section. For this purpose the lower section is supported by means of a pair of end supports and a suitable number of intermediate supports. The end supports, 368 respectively, are in the form of a receptacle receiving the ends of the plate 366 and having a resilient spacer 370 such as rubber between the inner walls of the receptacle and the edges of said plate. The intermediate supports, respectively, consist of a washer 372, a machine screw 374 threadedly connected with the upper section for slidably supporting the washer against the plate and a bushing 376 of resilient material, such as rubber, between the screw shank portion and the opening of said plate thru which the screw passes.

Vibratory motion is imparted to the lower plate during the welding operation and particularly during the flashing operation to obtain a wiping effect between the areas of contact of the work pieces and thereby facilitate the removal of undesirable materials and gas pockets. This results in obtaining an improvement in the grain structure of the weld metal and consequently a weld of high strength value equal to or better than the parent metal strength. Suitable means, such as a power driven vibrating device 378, or equivalent actuating means is associated with the yieldingly slidable plate for this purpose. As illustrated, an eccentric mass is rotatably mounted on and rotated by an electric motor 380 preferably variable speed type, about an axis normal to the plate, the shaft of the motor to which the eccentric mass 382 is connected being suitably journaled on the plate 366. Electric current is supplied to the motor from the transformer primary current supply. The plate 366 may be vibrated at all times during welding and is preferably terminated automatically when the current supply to the electrode is, as above described, automatically interrupted. This is accomplished by connecting the motor across the transformer primary winding terminals (not shown). A switch 384 is provided in one of the conductor lines to the motor for manually rendering the motor inoperative independently of the automatic control thereof.

Figs. 20 and 21 show in larger scale one of the pair of clamping devices 352 which are alike. This clamping device comprises generally a movable clamping member 358, a fixed clamping member 360 and an air cylinder 362.

The clamping member 358 is slidably mounted on the laterally extending edges of the plate 366 and is actuated either manually as by means of a rack 386 constituting part of said clamping member and a suitable hand tool 388 that is readily removably engageable with the different openings 390 in the side walls of the upper section and with gear teeth 392 for meshing engagement with said rack, or is power actuated by means of a double acting piston 394 of the air cylinder 362. The same source of air pressure utilized in actuating piston 66 (Fig. 2) is utilized for moving the double acting piston 394 of each cylinder, a suitable valve (not shown) being interposed between the fluid pressure conducting conduits 396, 398 and the source for controlling the flow to and from each side of the piston.

The cylinders 362 are fixedly connected to their respective fixed clamping members 360, the conduits being formed of flexible material enabling the movement of the cylinder with the current conducting span 354.

The current distributor 356 is slidably mounted on a driving screw 400 which is journaled in bearings 402, 404 mounted at the ends of the span. The current distributor is formed with a flat lower surface that contacts with the flat upper face of the section 364 over a sufficient area to provide a substantial current carrying capacity and is formed with a pair of downwardly extending fingers 406 at the rear thereof. These fingers are immersed into a current conducting liquid, such as mercury, contained in a container 408. This container is coextensive with the span and is supported by the frame. Welding current from the transformer secondary is conducted over a cable or bus bar 410. The driving screw 400 may be rotated in opposite directions by means of a suitable drive, such as a bevel gear transmission (not shown) and a hand wheel 412.

The pivoted hollow terminal 414 comprises in general a support 416 for the lower radiator section or sections, a variable capacity open ended container 418 for a current conducting liquid and a power device 420 for elevating and lowering the piston to different predetermined positions in said casing.

The casing is connected at its upper end to one end of a bus bar 422 and at its lower end to a yoke 424 that is pivotally connected by trunnions 426 to the sides of the machine frame 14'. The yoke is preferably formed of three parts, two legs 428 and a bite or base portion 430. The work support or piston member 416 is elevated and lowered substantially throughout the length of the casing by means of two pairs of relatively longitudinally movable driving and driven members, one member of each pair being connected to the casing and the other to the piston. As illustrated, the pairs of driving members are alike and comprise screw shafts 432 and internally threaded helical gears 434, the screw shafts being connected to the bottom side of the work support and extending downwardly through a pair of housings 436, in threaded engagement with the threaded gears 434 thru the base portion 430 of the yoke, thru slots (not shown) in the base of the machine frame and into the openings 438 of the machine foundation. Since the internally threaded gears 434 are journaled in the housings 436 and fixed against longitudinal displacement, rotation thereof in one direction will move the driving screw shafts 432 and work support upwardly and rotation thereof in the opposite direction will move said shafts and support downwardly. The extent of movement of the work support is sufficient to accommodate the maximum length of work piece which the casing 418 is designed to receive.

The driving gears 434 are simultaneously driven by means of an electric motor 440 and suitable transmission gearing including driven and driving bevel gears 442, 444 disposed within a housing 446 and respectively keyed to driven and driving shafts 448, 450 that are journaled in said housing 446. Keyed to the opposite ends of driven shaft 448 and within housings 436 are worm gears (not shown) meshing with helical gears 434.

The motor 440 is operatively controlled to actuate the work support in the same manner as the lower support 24 (Fig. 2) described above except that instead of the normally fixed rod 276 and cooperating make and break contacts 286, 288 carried by the support which serve to predeterminately position the work supporting electrode 26, there is provided for this purpose a rotatable camming member 452 that cooperates with a similar set of contacts 286', 288' and follower 294'. This rotatable camming member is drivingly connected with the work support 416 by means of a belt or cable drive including a driving cable or belt 454, a driven pulley 456 and a driving pulley 458 drivingly connected with said camming member by an endless belt 460. The driving belt is connected at its opposite ends 462, 464 to the opposite sides of the work support and passes over guide pulleys 466, 468 journaled at the top and bottom of the casing and passes under a pair of guide rollers 470 immediately above and below the driven pulley 456. These guide rollers and driven pulley are journaled in a bracket 472 supported by and at the side of the casing.

The cam member is provided with a pair of diametrically disposed notches 474 and a pair of lobes 476 that serve to raise the follower 294' out of each of the notches so that during each index of rotation of the cam member the circuit including the contacts 286', 288' will be interrupted twice. The spacing of the notches is predetermined to limit the downward movement of the support to points corresponding to successive positions of the welded radiator sections. Different predetermined extents of movement of the support can be provided for by substituting for the driving pulley 458 pulleys of different diameter corresponding to different spacings of radiator sections. The driven pulley is also drivingly connected with a consecutive counter 474' of well known construction for indicating the total number of movements of the support or the number of sections that have been united and received within the container. This is accomplished by means of a pair of diametrically oppositely disposed pins on the rear side of the cam member and arranged in driving relation with a gear 476' which is actuated at equal intervals, twice during each index of revolution.

The hollow terminal together with the work support and work support actuating means are tiltable away from the welding position to a position where the work is easily accessible for removal from the casing by means of an air cylinder 478 pivotally connected at its lower end to the frame. The double acting piston rod 480 of the air cylinder is connected to the casing thru a bell crank lever 482 and link 484.

Various modifications may be made in detail by those skilled in the art without departing from the invention as defined in the claims.

What I claim as new and desire to secure by Letters Patent is:

1. An electric flash welding machine comprising devices arranged to hold the articles to be welded, means arranged to produce relative movement between said devices to bring the articles to be welded into engagement and to exert pressure thereupon, means arranged for supplying welding current to said articles during said movement including variable means movable with one of said devices for controlling, at will, the distribution of current flow through said articles.

2. An electric flash welding machine of the type comprising work-holding devices, means for supplying a welding current to the articles to be welded and means operating at all times under maximum pressure for causing relative movement between said devices to bring the articles to be welded into engagement characterized by the fact that means are provided for effecting an initial engagement of said articles for a limited period of time, under sufficient pressure to obtain good electrical contact for preheating and for effecting disengagement of said articles and for thereafter obtaining, automatically, a predetermined rate and extent of movement of one of said work holding devices for bringing said articles into engagement with practically a minimum of pressure.

3. An electric flash welding machine of the type comprising work holding devices, means for supplying a welding current to the articles to be welded and means operating at all times under maximum pressure for causing relative movement between said devices to bring the articles to be welded into engagement characterized by the fact that means are provided for effecting an initial engagement of said articles for a limited period of time under sufficient pressure to obtain electrical contact to preheat the contacting portions of said articles to a relatively high temperature, for thereafter effecting a separation of said articles to draw an electric arc therebetween and for thereafter obtaining automatically a predetermined increasing rate of movement of one of said work holding devices and for limiting the extent of said movement at the instant when the joining edges of said article have reached a molten condition and flow together.

4. An electric flash welding machine of the type comprising work holding devices, means for supplying a welding current to the articles to be welded and means for supplying fluid pressure of predetermined value to one of said devices for causing relative movement between said devices to bring the articles to be welded into engagement characterized by the fact that means are provided for effecting an initial movement at a predetermined substantially constant rate of speed and for effecting engagement of said articles for a limited period of time to preheat the joining edges thereof, for effecting a slight separation of said articles to draw an electric arc therebetween and for thereafter obtaining automatically a predetermined increasing rate of movement of one of said work holding devices and for finally limiting the extent of said movement at the instant when the joining edges of said articles have reached a molten condition and flow together.

5. An electric-flash welding machine of the type comprising, work-holding devices and means for producing relative movements between said devices to bring the articles to be welded into engagement after one or more flashing-off operations characterized by the fact that means are provided for controlling the rate of speed during the flashing-off operation, means for stopping said movement at the end of said flashing-off operation corresponding substantially to a flow condition of the metal for obtaining a fusion of the adjoining edges with approximately a predetermined contact pressure between said articles and means are provided for supplying welding current to said articles during said movement.

6. An electric-flash welding machine of the type comprising, work-holding devices and means operating at all times under maximum pressure for producing relative movements between said devices to bring the articles to be welded into engagement after one or more flashing-off operations characterized by the fact that means are provided for controlling the rate of speed during the flashing-off operation, means for stopping said movement at the end of said flashing-off operation corresponding substantially to a predetermined change in the character of the metal for obtaining approximately a predetermined contact pressure between said articles such as will practically avoid crushing of the grain structure of the metal of the adjoining ends and means are provided for supplying welding current to said articles during said movements.

7. An electric-flash welding machine of the type comprising, work-holding devices and means for producing relative movements between said devices to bring the articles to be welded into engagement after one or more flashing-off operations characterized by the fact that means are provided for controlling the rate of speed of said relative movement for a predetermined extent corresponding to predetermined changes in the character of the metal during the flashing-off operation and means for limiting the extent of said relative movement for obtaining approximately a predetermined contact pressure between said articles to prevent excessive upsetting of the weld metal and means are provided for supplying welding current to said articles during said movement.

8. An electric-flash welding machine of the type comprising, work-holding devices and means for producing relative movements between said devices to bring the articles to be welded into engagement after one or more flashing-off operations characterized by the fact that means are provided for causing a gradually increasing speed in said relative movement corresponding to a gradually increasing change in the temperature of the metal means for causing at the end of a predetermined distance of said relative travel corresponding to a flow condition of said metal abruptly increasing and decreasing speeds of said relative travel in rapid succession for joining said articles with a minimum of pressure such as to practically avoid crushing of the grain structure of the metal of the adjoining ends and means are provided for supplying welding current to said articles during said movement.

9. An electric-flash welding machine of the type comprising, work-holding devices, power means for causing relative travel between said devices to bring the articles to be welded into engagement, and means arranged to supply a welding current to the articles during said travel and for interrupting said current at the end of said travel, characterized by the fact that means are provided for regulating, at will, the relative movements of said devices along a predetermined distance of said travel and means are provided for thereafter, automatically, controlling the relative rate of speed for a predetermined extent of travel of said devices in accordance with predetermined changes in the character of the metal during the flashing-off operation and means for limiting said travel to said predetermined extent to limit the pressure with which said articles are brought together.

10. An electric-flash welding machine of the type comprising, work-holding devices, power means operating at all times at maximum designed pressure for causing relative travel between said devices to bring the articles to be welded into engagement, and means arranged to supply a welding current to the articles during said travel and for interrupting said current at the end of said travel, characterized by the fact that means are provided for regulating, at will, the relative movements of said devices along a predetermined distance of said travel, means operatively responsive to the movement of one of said devices for thereafter, automatically, controlling the relative rate of speed of said devices for a predetermined extent of travel, means interrupting said last-mentioned means at the end of said predetermined distance of travel for effecting a rapid relative acceleration of said devices, and means for limiting the pressure with which said articles are brought together.

11. An electric-flash welding machine of the type comprising, work-holding devices, power means operating at all times at maximum designed pressure for causing relative travel between said devices to bring the articles to be welded into engagement, and means for supplying a welding current to the articles during said travel and for interrupting said current at the end of said travel, characterized by the fact that means are provided for regulating, at will, the relative movements of said devices along a predetermined distance of said travel, liquid metering means for thereafter, automatically, controlling the movement of said devices to obtain an increasing speed for a predetermined extent of travel, means for interrupting said liquid control at the end of said predetermined extent of travel to obtain a rapid acceleration of said relative movement and means for limiting the travel of said devices during said acceleration for causing said articles to be brought together with a minimum of pressure.

12. An electric-flash welding machine of the type comprising, work-holding devices, power means operating at all times at maximum designed pressure for causing relative travel between said devices to bring the articles to be welded into engagement, and means for supplying a welding current to the articles during said travel and for interrupting said current at the end of said travel, characterized by the fact that means are provided for regulating, at will, the relative movements of said devices along a predetermined distance of said travel, liquid metering means regulated by the movement of one of said devices for automatically controlling the rate of speed for a predetermined distance of said travel corresponding to a predetermined change in the character of the metal during the period of said travel, means for interrupting said control at the end of said predetermined extent of travel for obtaining a rapid acceleration of said relative movement and means for limiting the travel of said devices to cause said articles to be brought together with a minimum of pressure.

13. An electric-flash welding machine of the type comprising work-holding devices means arranged to supply welding current to said devices, and means for causing relative movement between said devices to bring the articles to be welded into limited pressure engagement at the end of a predetermined distance of travel to avoid excessive upsetting of the metal, said means including variable means for controlling, at will, the relative movement of said work-holding devices to obtain a varying speed during the initial portion of said movement and means for thereafter automatically controlling said movement to obtain a gradually increasing speed during an intermediate portion of said movement and abruptly increasing and decreasing speeds during the final portion of said movement.

14. In an electric flash-welding machine of the type comprising, work-holding devices, means for producing relative movement between said devices to bring the articles to be welded into engagement, means for controlling said first-mentioned means to maintain an arc of predetermined character for a predetermined distance of travel after producing said arc, said means including an electro-magnetically operated device, said last mentioned device being rendered operative by and being operable independent of one of said work holding devices after a predetermined movement thereof to regulate said control means in such a manner as to effect an increase in the relative speed of said devices during the last part of said travel.

15. In an electric flash-welding machine of the type comprising, work-holding devices, means for producing relative movement between said devices to bring the articles to be welded into engagement, metering means for controlling said first-mentioned means and regulating means connected to be responsive to the relative movement of said work-holding devices for controlling said metering means for a predetermined distance of travel in accordance with predetermined changes in the character of the metal, said regulating means including an electro-magnetically operated device for interrupting said control means when a predetermined change in the character of the metal is obtained.

16. In an electric-flash welding machine of the type comprising, work-holding devices, means for producing relative movement between said devices to bring the articles to be welded into engagement, means for controlling said first-mentioned means to maintain an arc of predetermined character for a predetermined distance of travel after producing said arc, said means including an electro-magnetically operated device said last mentioned device being rendered operative by and being operable independent of one of said work holding devices after a predetermined movement thereof to regulate said control means in such a manner as to effect an increase in the relative speed of said devices during the last part of said travel, and means for limiting said travel to a predetermined extent.

17. In an electric-flash welding machine of the type comprising, work-holding devices, means for producing relative movement between said devices to bring the articles to be welded into engagement, metering means for controlling said first-mentioned means and regulating means connected to be responsive to the relative movement of said work-holding devices for controlling said metering means for a predetermined distance of travel in accordance with predetermined changes in the character of the metal, said regulating means including an electro-magnetically operated device for interrupting said control means when a predetermined change in the character of the metal is obtained, and means for limiting said travel to a predetermined extent.

18. In an electric resistance welding machine, an electric supply system comprising, a source of current, a pair of electrodes arranged to receive and weld together parts of an article at a plurality of spaced areas of contact that are arranged and disposed on opposite sides of the electrical mid point of each electrode so as to provide a corresponding plurality of current paths and adjustable means for differentially varying, at will, said current path lengths to compensate for unequality in the resistance of said paths.

19. In an electric resistance welding machine, an electric supply system comprising, a source of current, a pair of electrodes arranged to receive and weld together parts of an article at different areas of contact, one of said electrodes including a liquid conductor relatively arrangeed with respect to said areas and said electrode as to provide branches of substantially equal length, the other of said electrodes being electrically symmetrically disposed with respect to said areas and having means for varying the electrical symmetry of said last mentioned electrode to compensate for unequal resistances in said branches.

20. In an electric resistance welding machine, an electric supply system comprising, a source of current, a pair of electrodes arranged to receive and weld together parts of an article at different areas of contact, one of said electrodes including a liquid conductor relatively arranged with respect to said areas and said electrode as to provide branches of substantially equal length, the other of said electrodes being electrically symmetrically disposed with respect to said areas and having differential adjustable means for varying the electrical symmetry of said last-mentioned electrode to compensate for unequal resistances in said branches.

21. An electric welding machine of the type comprising work-holding devices and means for producing relative movement between said devices to bring the articles into engagement for effecting a weld, characterized by the fact that one of said work-holding devices is vertically adjustable to receive and position varying lengths of one piece of work in predetermined relation to another, a source of current conducting liquid, means for supplying said liquid between said device and the work piece carried thereby and to a predetermined level for effecting a transfer of current between them and means for maintaining said liquid level substantially the same for all lengths of work carried by said support.

22. An electric welding machine of the type comprising work-holding devices and means for providing relative movement between said devices to bring the articles into engagement for effecting a weld, characterized by the fact that means are provided for moving one of said devices to different predetermined operating positions corresponding to different predetermined lengths of work comprising means for initiating said movement for each position and means operatively responsive to the movement of said support to interrupt said movement as said support is moved in succession from one predetermined position to another.

23. In an electric resistance welding machine a work-support means for moving said support to different operating positions corresponding to different predetermined sizes of work comprising, power means for actuating said support, means for initiating the operation of said power means and means operative in response to the movement of said support to interrupt said movement as said support is moved from one predetermined position to another.

24. In an electric resistance welding machine a work-support means for moving said support to different operating positions corresponding to different predetermined sizes of work comprising, power means for actuating said support, means for initiating the operation of said power means and means operative in response to the movement of said support to interrupt said movement as said support is moved from one predetermined position to another and means for supplying a current conducting liquid between said support and said work and for maintaining a fixed relation therebetween for all positions of said support.

25. A multiple weld electric flash welding machine of the type comprising work holding devices and means for producing relative movement between said devices to bring the articles into engagement at spaced areas of welding characterized by the fact that means adjustable relative to one of said devices is provided for distributing the current flow to compensate for inequalities in the resistances at the spaced areas of welding.

26. An electric flash welding machine of the type comprising work holding devices, means for supplying a welding current to the articles to be welded and means operating at all times under maximum pressure for causing relative movement between said devices to bring the articles to be welded into engagement after a flashing off operation characterized by the fact that means responsive to the movement of one of said work holding devices is provided for controlling the rate of speed during the flashing off operation and further means is provided for interrupting said pressure operated means at the end of said flashing off operation corresponding to a predetermined extent of travel to rapidly decelerate and limit said relative movement and thereby bring said articles together with a minimum of pressure.

27. In an electric flash-welding machine of the type comprising, work-holding devices, means for producing relative movement between said devices to bring the articles to be welded into engagement, means for controlling said first-mentioned means to maintain an arc of predetermined character for a predetermined distance of travel after producing said arc, said means including an electro-magnetically operated device, said last mentioned device being rendered operative by and operable independent of one of said work holding devices after a predetermined movement thereof to regulate said control means in such a manner as to effect a predetermined change in the relative speed of said devices during the last part of said travel.

28. In an electric flash-welding machine of the type comprising, work-holding devices, means for producing relative movement between said devices to bring the articles to be welded into engagement, means for controlling said first-mentioned means to maintain an arc of predetermined character for a predetermined distance of travel after producing said arc, said means including an electro-magnetically operated device, said last mentioned device being rendered operative by and operable independent of one of said work holding devices after a predetermined movement thereof to regulate said control means in such a manner as to effect an abruptly increasing relative speed of said devices during the last part of said travel and means for abruptly terminating said travel at the end of a predetermined distance of travel corresponding to a position where said articles are brought together with a minimum of pressure.

29. In an electric flash-welding machine of the type comprising, work-holding devices, means for producing relative movement between said devices to bring the articles to be welded into engagement, means for controlling said first-mentioned means to maintain an arc of predetermined character for a predetermined distance of travel after producing said arc, said means including a device rendered operative by and operable independent of one of said work holding devices after a predetermined movement to regulate said control means in such a manner as to effect a predetermined change in the relative speed of said devices during the last part of said travel.

30. In an electric resistance welding machine, an electric supply system comprising, a source of current, a pair of electrodes arranged to receive and weld together parts of an article at spaced areas of contact that are disposed on opposite sides of the electrical mid point of each electrode and adjustable means associated with at least one of said electrodes for adjusting the current distribution thru said electrode to compensate for unequality in the resistances of the metals of said spaced areas.

31. In an electric resistance welding machine, an electric supply system comprising, a source of current, a pair of electrodes arranged to receive and weld together parts of an article at areas of contact that are disposed on opposite sides of the electrical mid point of each electrode and relatively far apart and means associated with at least one of said electrodes for adjusting the current distribution thru said electrode to compensate for unequality in the resistances of the metals of said contact areas.

32. In a flash welding machine, a hollow member, a work-supporting welding-electrode arranged therewithin and movable to different positions corresponding to different given lengths of a part of an article to be formed by welding, a current conducting liquid in said hollow member and means for maintaining said liquid at a predetermined level in the neighborhood of the uppermost position of said support regardless of the liquid volume displacement of the work piece.

33. In a flash welding machine, a hollow member, a work-supporting welding-electrode arranged therewithin and movable to different positions corresponding to different given lengths of a part of an article to be formed by welding, a current conducting liquid in said hollow member and means for maintaining said liquid at a predetermined level in the neighborhood of the uppermost position of said support regardless of the liquid volume displacement of the work piece and an electrical connection to said hollow member at said predetermined level.

34. In a flash welding machine, a current conducting liquid receiving member, means for supporting a part of an article to be formed by welding, said supporting means being disposed in and adapted to be electrically connected with said receiving member thru the current conducting liquid therein, means to move said supporting means successively into different operative positions and means for moving both said means and said article laterally away from an operative position of said supporting means to permit the removal of said article from said machine.

35. In a flash welding machine, a hollow member, a work-supporting welding-electrode arranged therewithin and movable to different positions corresponding to different given lengths of a part of an article to be formed by welding a current conducting liquid in said hollow member, means for maintaining said liquid at a predetermined level in the neighborhood of the uppermost position of said support regardless of the liquid volume displacement of the work piece, means for actuating said supporting means carried by said hollow member and means for moving said hollow member said work support actuating means and said work piece laterally away from an operative position of said work-supporting electrode to permit the removal of said work piece from said machine.

36. In a flash welding machine with electrodes arranged to flash weld abutting edges of parts of an article, vibrating means supported by one of said electrodes for effecting relatively small lateral displacements of said parts during welding.

37. In an electric resistance welding machine with electrodes arranged to weld abutting edges of parts of an article, means associated with said electrodes for effecting relatively small lateral displacements therebetween during welding of said parts.

38. In an electric resistance welding machine with work-supporting electrodes arranged to be moved relatively towards each other to bring the parts to be welded into engagement, means for actuating one of said electrodes during welding of said parts in a direction transversely of the direction of said engaging movement.

39. In an electric resistance welding machine with work-supporting electrodes arranged to be moved relatively towards each other to bring the parts to be welded into engagement, one of said electrodes being yieldingly movable in a direction in the plane of the abutting edges and means for effecting reciprocating motion of said electrode in said plane during welding.

40. In an electric resistance welding machine with work-supporting electrodes arranged to be moved relatively towards each other to bring the parts to be welded into engagement, one of said electrodes being yieldingly movable in a direction in the plane of the abutting edges, means for effecting reciprocating motion of said electrode in said plane during welding, and means for terminating said reciprocating movement simultaneously with the cutting off of the welding current.

41. In an electric resistance welding machine, an electric supply system comprising, a source of current, a pair of electrodes arranged to receive and simultaneously weld together parts of an article at areas of contact that are remotely disposed with respect to each other and means operatively associated with said electrodes to proportionately distribute the flow of welding current to said contact areas.

42. In an electric resistance welding machine, an electric supply system comprising, a source of current, a pair of electrodes arranged to receive and simultaneously weld together parts of an article at areas of contact that are remotely disposed with respect to each other and means operatively associated with and carried by one of said electrodes to proportionately distribute the flow of welding current to said contact areas.

FRANK H. REHSE.